United States Patent [19]

Fisher et al.

[11] Patent Number: 5,183,833
[45] Date of Patent: Feb. 2, 1993

[54] ULTRAVIOLET RADIATION PHOTOPOLYMERIZATION OF ACRYLIC ESTER PRESSURE SENSITIVE ADHESIVE FORMULATION

[75] Inventors: Dennis K. Fisher; Brian J. Briddell, both of Jackson, Mich.

[73] Assignee: Adco Products Inc., Michigan Center, Mich.

[21] Appl. No.: 568,760

[22] Filed: Aug. 17, 1990

Related U.S. Application Data

[62] Division of Ser. No. 431,033, Nov. 2, 1989, Pat. No. 4,968,558.

[51] Int. Cl.$^5$ .......................... C08F 2/50; C08F 20/18; C08F 20/20; C08F 20/06
[52] U.S. Cl. ................................. 522/182; 522/120; 522/913; 522/121
[58] Field of Search ............... 522/182, 120, 121

[56] References Cited

U.S. PATENT DOCUMENTS

| | | | |
|---|---|---|---|
| Re. 24,906 | 12/1960 | Ulrich | 206/59 |
| 2,753,285 | 7/1956 | Pahl et al. | 154/53.5 |
| 2,907,682 | 10/1959 | Eichel | 117/122 |
| 2,925,174 | 2/1960 | Stow | 206/59 |
| 2,956,904 | 10/1960 | Hendricks | 117/93 |
| 3,314,838 | 4/1967 | Erwin | 156/71 |
| 3,328,194 | 6/1967 | Kasper et al. | 117/62 |
| 3,331,729 | 7/1967 | Danielson et al. | 161/162 |
| 3,502,497 | 3/1970 | Crocker | 117/68.5 |
| 3,661,618 | 5/1972 | Brookman et al. | 117/62 |
| 3,690,937 | 9/1972 | Guse et al. | 117/122 P |
| 3,725,115 | 4/1973 | Chistenson et al. | 117/93.31 |
| 3,729,338 | 4/1973 | Lehmann et al. | 117/122 P |
| 3,772,063 | 11/1973 | Fukukawa et al. | 117/93.31 |
| 3,840,448 | 10/1974 | Osborn et al. | 204/159.12 |
| 3,920,877 | 11/1975 | Barber | 522/97 |
| 4,038,454 | 7/1977 | Lehmann et al. | 428/356 |
| 4,049,483 | 9/1977 | Loder et al. | 156/230 |
| 4,177,074 | 12/1979 | Proskow | 522/121 |
| 4,181,752 | 1/1980 | Martens | 522/182 |
| 4,223,067 | 9/1980 | Levens | 428/308 |
| 4,243,500 | 1/1981 | Glennon | 204/159.12 |
| 4,303,485 | 12/1981 | Levens | 204/159.24 |
| 4,323,636 | 4/1982 | Chen | 522/121 |
| 4,329,384 | 5/1982 | Vesley et al. | 428/40 |
| 4,364,972 | 12/1982 | Moon | 427/54.1 |
| 4,415,615 | 11/1983 | Esmay et al. | 428/40 |
| 4,423,135 | 12/1983 | Chen | 522/121 |
| 4,612,242 | 9/1986 | Vesley et al. | 428/313.9 |
| 4,666,771 | 5/1987 | Vesley et al. | 428/325 |
| 4,710,536 | 12/1987 | Klingen et al. | 524/493 |
| 4,749,590 | 6/1988 | Klingen et al. | 427/54.1 |
| 4,818,610 | 4/1989 | Zimmerman et al. | 428/345 |
| 4,855,170 | 8/1989 | Darvell et al. | 428/40 |
| 4,950,537 | 8/1990 | Vesley et al. | 428/345 |

FOREIGN PATENT DOCUMENTS 675420 5/1966 Belgium .

Primary Examiner—Marion E. McCamish
Assistant Examiner—Arthur H. Koeckert
Attorney, Agent, or Firm—Joan I. Norek; Robert A. Miller; Joseph B. Barrett

[57] ABSTRACT

A pressure sensitive adhesive is prepared by the polymerization of an appropriate acrylic ester formulation of the type that includes an ethylenically unsaturated monomer having a polar group, and at least part of such polymerization is accomplished by photopolymerization using a source of ultraviolet radiation that provides a substantial portion of its ultraviolet radiation in the wavelength band of from about 280 to about 350 nm and a light intensity at the surface of the formulation being polymerized of no more than about 4.0 milliwatts/cm$^2$.

15 Claims, No Drawings

ULTRAVIOLET RADIATION PHOTOPOLYMERIZATION OF ACRYLIC ESTER PRESSURE SENSITIVE ADHESIVE FORMULATION

This is a division of application Ser. No. 07/431,033, filed on Nov. 2, 1989, now U.S. Pat. No. 4,968,558.

TECHNICAL FIELD OF THE INVENTION

The present invention is in the technical field of pressure sensitive adhesives, and in particular the field of processes for preparing pressure sensitive adhesives at least partially by photopolymerization.

BACKGROUND OF THE INVENTION

Pressure sensitive adhesives are widely used for a multitute of purposes, such as various sealing and attachment purposes. Pressure sensitive adhesives may be formed as as an adhesive layer supported by a nonadhesive foundation material, which foundation may be a flexible carrier or a rigid body. Pressure sensitive adhesives may also be formed as double-faced systems, for instance as a flexible or rigid carrier faced On both sides with an adhesive layer. Such a carrier may itself be nonadhesive, although for certain applications, discussed in more detail below, the carrier supporting the two adhesive layers has itself some pressure sensitive adhesive qualities. Pressure sensitive adhesive layers vary widely as to thickness, from a fraction of a mil to much greater thicknesses.

Pressure sensitive adhesives formed substantially from acrylate copolymers are well known in the art. For instance, certain acrylate copolymers, that are both normally tacky and yet possess a reasonable degree of internal strength, are disclosed in U.S. Pat. No. Re 24,906 (Ulrich) which reissued from original U.S. Pat. No. 2,884,126 in December, 1960. Such copolymers are comprised of certain non-tertiary acrylic esters copolymerized with monomers having strongly polar groups, for instance acrylic acid, methacrylic acid, acrylamide, methacrylamide, itaconic acid, and the like. Such non-tertiary acrylic esters are generally acrylic acid esters of non-tertiary alkyl alcohols, such alcohols having up to 14 carbons, and further having an average of from 4 to 12 carbons. Small amounts of other monomers may also be incorporated into such polymers. Such adhesive polymers are typically applied to a flexible sheet material for use.

Photopolymerization of pressure sensitive adhesive materials of the acrylate copolymer type is generally known. While such acrylate copolymers may be prepared by solution or emulsion polymerization techniques, there are manufacturing disadvantages of preparing the polymers in such fashion. If solution polymerization is used, the solvent must be removed, typically by drying it off at elevated temperatures, which involves the employment of significant processing equipment and may create environment and safety hazards. Emulsion polymerization also requires the polymer to be separated from the liquid used, that is, the water. While the emulsified polymer may be separated by precipitation, rather than drying off the water, the resultant polymer will contain the surfactant used in the polymerization, which may be detrimental to the end-use, and additional processing steps beyond the polymerization itself are required. Photopolymerization of the monomers neat, without any diluent that needs to be removed after the polymerization, provides processing advantages in the manufacture of pressure sensitive adhesives. For instance, Belgium Patent No. 675,420, published in May of 1966, discloses a process for the fabrication of adhesive tapes comprising flexible carriers and polyacrylic adhesive coatings thereon by polymerizing the monomers directly on the carrier using photopolymerization through exposure of the monomers, containing a photoinitiator, to ultraviolet radiation. The liquid acrylic monomer(s), which may be thickened, are applied to the carrier using a doctor blade or roller coating, or by spraying, and then polymerized, avoiding any post-polymerization removal of diluent or other extraneous material. Exemplified is a typical pressure sensitive formulation, a mixture of ethyl hexyl acrylate and acrylic acid, that is coated onto a cellulose acetate sheet and is passed into a tunnel, from which oxygen has been excluded, the upper wall of which is formed of quartz glass, and is irradiated with a source of ultraviolet radiation through such upper wall. The source of ultraviolet radiation used is a high pressure mercury vapor lamp. A mercury bath is used to avoid an overly high temperature that would otherwise ensue from the exothermic polymerization reaction. Also disclosed in this patent is: the use of a temporary carrier that is an endless belt, which does not become incorporated into the end product; the use of the photopolymerization technique as only a portion of the polymerization process, for instance the polymerization being completed in an oven; and the preparation of tapes having a pressure sensitive adhesive layer on both sides.

It is also known to prepare a pressure sensitive adhesive tape by first forming a prepolymer of at least some of the monomers to be used, and then coating such prepolymer to the desired thickness before completion of the polymerization. For instance, U.S. Pat. No. 3,729,338 (Lehmann et al.) discloses the preparation of a low molecular weight, spreadable composition which is applied to the support material, to which composition may be added a small amount of catalyst and/or a polyfunctional cross-linking monomer, prior to the completion of the polymerization by heat curing. Such low molecular weight polymer, or prepolymer, is thicker or more viscous than the liquid monomers and hence is more easily applied as a coating to the support material before polymerization is completed.

Pressure sensitive adhesive tapes that are both relatively thick and are comprised of layers of acrylate esters have been prepared using photopolymerization techniques. For instance, U.S. Pat. No. 4,223,067 (Levens) describes the preparation of a pressure sensitive adhesive tape that may be from 0.2 to 1.0 mm thick. Such tape is comprised of a pressure sensitive adhesive matrix which further contains glass microbubbles, which optionally may have one or both of its sides coated with an unfilled pressure sensitive adhesive. The photopolymerization is accomplished by exposure to ultraviolet BL and BLB lamps. Where a laminate of both filled and unfilled layers was prepared, the separate polymerized layers were laminated together using a pressure roll.

The use of BL and BLB lamps in particular for the photopolymerization of acrylate ester pressure sensitive adhesives is discussed in detail in U.S. Pat. No. 4,181,752 (Martens et al.). Such lamps emit ultraviolet radiation that peaks at about 351 nm, and the energy emitted at ultraviolet radiation wavelengths shorter than 300 nm is less than 10 percent of that in the 300 to 400 nm range, and at a distance of about 3 inches have a light intensity in the 300–400 nm wavelength band of about 0.337 milliwatts/cm$^2$. An unduly slow polymerization is noted as being disadvantageous to the manufacture of the pressure sensitive adhesive.

The present invention is directed to a process for preparing a pressure sensitive adhesive at least in part by photopolymerization of acrylate esters or prepolymers thereof, wherein by virtue of the source of ultraviolet radiation employed, the polymerization is completed at a faster rate without loss of performance properties of the end product. The present invention is also directed to such a process for the preparation of a pressure sensitive adhesive, particularly a relatively thick pressure sensitive adhesive, wherein many of the performance properties of the end product are improved.

DISCLOSURE OF THE INVENTION

The present invention provides a method of preparing an acrylic ester pressure sensitive adhesive including the step of at least partially photopolymerizing an acrylic ester pressure sensitive adhesive formulation by exposure to a source of ultraviolet radiation that, at least within the ultraviolet wavelength band of from 200 to 400 nm, provides a substantial portion of its energy in the 280 to 350 nm wavelength band and provides an intensity of no more than about 4.0 milliwatts/cm$^2$ at the surface of the formulation being polymerized. A minimum intensity of 0.1 milliwatts/cm$^2$ is often a practical limit. Such polymerization should be accomplished in the absence of oxygen, which is well known to inhibit the polymerization of ethylenically unsaturated monomers. The acrylic ester pressure sensitive adhesive formulation is a combination of non-tertiary acrylic acid esters of alkyl alcohols and ethylenically unsaturated monomer(s) having at least one polar group, which may be substantially in monomer form, or may be a low molecular weight prepolymer thereof, or an admixture of prepolymer and additional monomeric species, and may further contain other substances, for instance a photoinitiator, various filler materials, cross-linking agents such as monomers having a plurality of ethylenically unsaturated sites, monomers other than those fundamental to a normally-tacky pressure sensitive adhesive formulation, and the like. The process of the present invention provides the manufacturing advantages of completion of the polymerization to the desired degree of conversion of monomer to polymer at a faster rate without loss of performance properties of the end product, and particularly for the manufacture of a relatively thick pressure sensitive adhesive, an improvement of many of the performance properties of the end product.

PREFERRED EMBODIMENTS OF THE INVENTION

The process of the present invention entails exposure of an acrylic acid ester pressure sensitive adhesive formulation to a source of ultraviolet radiation having certain characteristics. Such characteristics are that a substantial portion of its energy, particularly its ultraviolet energy, is the wavelength range of from 280 to 350 nm, and that the light intensity, as measured at the surface of the formulation being polymerized, is low intensity, namely no more than about 4.0 milliwatts/cm$^2$. One source of such ultraviolet radiation that is readily commercially available are fluorescent "UV-B" lamps, also referred to as sunlamps, such as those available from North American Phillips under the trade designations of FS-20 and FS-40, which were previously made and sold by the Westinghouse Company. Later references to such bulbs herein will use the "Westinghouse" designation which appears on the bulbs actually used. These are tubular fluorescent bulbs which are coated on the inside with certain phosphors that fluoresce and radiate a considerable amount of ultraviolet radiation energy in the 280 to 350 nm wavelength band, and have a spectral power peak at about 310 nm wavelength. Within the ultraviolet wavelength band of 200 to 400 nm, about 22 percent of the energy or power radiated is of wavelengths less than 300 nm and the remainder, or about 78 percent of the radiated energy or power, is of wavelengths greater than 300 nm. One sample of a Westinghouse Sunlamp FS-20 was measured at a reference plane of 1 meter from the lamp at intervals of 10 nm from 200 to 400 nm and it was determined that 21.7 percent of the measure energy was of the wavelengths of from 200 to 300 nm and the remaining 78.3 percent was of the wavelengths of from 300 to 400 nm.

Such UV-B lamps emit about 90 percent of their ultraviolet radiation in the wavelength band of from about 280 to about 350 nm, and it is preferred that the source of ultraviolet radiation emit at least about 80 percent of its UV radiation in the wavelength band of from 280 to 350 nm. Of the energy emitted in the wavelength band of from 280 to 350 nm, such UV-B lamps emit about 22 percent thereof in the wavelength band of from 280 to 300 nm and about 88 percent thereof in the wavelength band of from 300 nm to 350 nm. Of the energy emitted in the wavelength band of from 280 to 350 nm, such UV-B lamps emit about 85 percent therof in the more narrow defined wavelength band of from about 290 to 335 nm, and it is preferred that the source of ultraviolet radiation emit at least 70 percent of its energy from the 280 to 350 nm wavelength band in the wavelength band of from about 290 to 335 nm. The use of such type of UV-B lamps herein described as the source of ultraviolet radiation is itself an additional preferred embodiment of the invention.

Such UV-B bulbs have a wattage of about one watt per inch of linear length, the FS-20 lamp being a 20 watt bulb which about two feet in length, and the FS-40 lamp being a 40 watt bulb approximately twice as long as the FS-20 lamp. The intensity of the radiation emitted from such a generally cylindrical source of radiation will vary inversely with the distance from the lamp. At a distance of about 6 inches from the lamp, the UV-B lamp is well within an intensity maximum of up to about 4.0 milliwatts/cm$^2$ at the formulation surface, and further is within the intensity range of from 0.1 to 4.0 milliwatts/cm$^2$.

As long as the acrylic ester pressure sensitive adhesive formulation is disposed so that exposure of such formulation to the particular ultraviolet radiation of the present process is possible, the present process can be applied. The formulation may be set down as a layer on a flexible carrier or rigid body, and be exposed to the radiation source from above; it may be coated onto the bottom of such carrier or body and be exposed to the radiation source from below. It may be sandwiched between two sheets of material sufficiently transparent to ultraviolet radiation to permit exposure to the source of radiation simultaneously or alternately from above and below. It may be set down and polymerized on another layer formed of pressure sensitive adhesive formulation. The formulation may be polymerized as a reasonably thick layer in and of itself, for instance up to about a thickness of 60 mils, or a thick layer may be composed of a plurality of layers, each separately photopolymerized, layers subsequent to the first being set down on the material already photopolymerized. The avoidance of oxygen at the site of the photopolymerization may be achieved in any manner that does not interfere with photopolymerization. For instance, the formulation to be photopolymerized may be sandwiched between two plates thereby excluding oxygen-containing air from the site of the polymerization. The formulation may be placed in a vessel or chamber that has been purged with an oxygen-free gas, such as nitrogen, and such an oxygen-free gas may be maintained as the atmosphere therein during the photopolymerization. Since many techniques for excluding oxygen impose a plate or wall between the formulation to be polymerized and the source of radiation, it is important to choose a plate or wall of appropriate material that, given the specific characteristics of the initially emitted radiation, the radiation that accomplishes the photopolymerization, that is the effective source of radiation, has the characteristics as set forth above. In other words, any material disposed between the formulation and the ultraviolet lamp(s) used is potentially a filter for the ultraviolet radiation to a degree, and the source of radiation, as to the characteristics set forth above, includes any filter effect present during polymerization. The UV-B bulbs described above alone have the desired characteristics when used at a reasonable distance from the formulation being polymerized, and such characteristics are not inappropriately altered when quartz glass is disposed between the lamps and the formulation. Other materials may alter to an unsuitable degree the radiation from the UV-B lamps even though reasonably transparent to visible light. Alternatively, the filter effect of a plate or wall, or a separate filter, may be used to so alter the radiation characteristics of an otherwise unsuitable lamp to provide a source of radiation within the present invention.

The foundation of the acrylic ester pressure sensitive adhesive formulation may be the copolymers described in the Ulrich U.S. Pat. No. Re 24,906, noted above, the disclosures of which are hereby incorporated hereinto by reference. Of the various monomers having strongly polar groups, acrylic acid is often the chosen monomer for pressure sensitive adhesives. The acrylic acid alkyl esters generally should be selected in major portion from those that as homopolymers possess some pressure sensitive adhesive properties or tackiness, such as acrylic acid esters of n-butanol or isobutanol, or alkyl alcohols of greater carbon chain length, such n-pentanol, isopentanol, 2-methylbutanol, 1-methyl pentanol, 3-methyl pentanol, 2-ethyl butanol, 3-heptanol, 2,5,5-trimethyl hexanol, isooctanol, 2-ethylhexanol, n-octanol 3-ethyl hexanol, 4-ethyl heptanol, 4-methyl octanol, n-decanol, isodecanol, and the like. The alcohols forming the acrylic acid esters may be primary or secondary, and the carbon chains may be linear, branched, or cyclic.

In preferred embodiment, the major portion of the non-tertiary acrylic acid alkyl esters are formed from alcohols having from about 4 to 10 carbons. In further preferred embodiment, based on the combined amount of acrylic acid alkyl ester and polar-moiety containing monomer units, the formulation contains about 55 to 95 mole percent of the acrylic acid alkyl ester(s).

In addition to acrylic acid, itaconic acid, or acrylamide as the polar-moiety containing monomer, other possible monomers include maleic anhydride, B-carboxyethylacrylate, acrylonitrile, cyanoethylacrylate, hydroxyalkylacrylates, N-substituted acrylamides, similar methacrylic monomers, and the like.

Often the cross-linking of such polymers is desired for a given end use and suitable cross-linking agents are molecules having a plurality of ethylenically-unsaturated sites. Suitable agents of such type are di- and triacrylates, for instance 1,6-hexanediol diacrylate. Other cross-linking agents may also be used. When a simple cross-linking agent such as 1,6-hexanediol diacrylate is used, the amount of such agent in a formulation is generally from about 0.005 to 0.5 weight percent, based on total weight of polymer in the formulation, and more typically from about 0.01 to about 0.2 weight percent. If a triacrylate agent is used, for the same general effect less is required than a diacrylate.

In preparing the pressure sensitive adhesive a mixture of monomers, optionally including other substances, such as fillers or the like, may be first prepolymerized and then the prepolymer subjected to further polymerization. As mentioned above, one advantage of first forming a prepolymer is to provide a formulation of higher viscosity than the liquid monomers. Such higher viscosity provides a formulation that often is easier to handle, for instance to apply as a layer to some support material, than the monomer mixture, and the increased viscosity is provided without the addition of thickening agent(s). Further, where desired, a prepolymer may be formed that includes a separate agent for thickening the formulation or for other handling purposes. The mixture of monomers may be partially converted to low molecular weight polymers, or a prepolymer, using the process of the present invention, or it may be formed using another polymerization technique. The prepolymer may be further polymerized by the process of the present invention without any additional materials added thereto, provided it is sufficiently sensitized for photopolymerization, or various materials may be added thereto before subjecting it to the process of the invention. For instance, a chemical photoinitiator, or additional photoinitiator, may be added after the prepolymer is formed. Filler, or additional filler, may likewise be added. When prepolymers are first formed for an ultimate end product that is cross-linked, typically the cross-linking agent is added only after the formation of the prepolymer. It may be desirable in some applications to change the proportion of monomer units or to add additional monomer species to the prepolymer prior to completion of the polymerization. Although usually the formation of a prepolymer, when it is desired to avoid diluents that must be removed from the end product, is done by partially polymerizing a mixture of diluent-free monomers, such prepolymer may be formed by diluent solution or emulsion polymerization techniques when desired. In addition, although the advantages of the present invention have been seen in polymerizations performed on formulations that were free of diluent, this does not exclude the potential for use of the present process for polymerizing formulations that contain some amount of diluent or solvent if the removal of such solvent is either not necessary for the end product or is not of concern to the manufacturer. Nonetheless the process of the present invention, involving the use of photopolymerization to prepare a pressure sensitive adhesive, has an inherent advantage of being used on diluent-free formulations so as to avoid the problems generally attendant upon the presence of, and the removal of, diluents and solvents.

As mentioned above, the acrylic ester pressure sensitive adhesive formulation that is subjected to photopolymerization during the process of the present invention, may be a mixture of monomers, a prepolymer, or a prepolymer to which additional monomers have been added. The formulation may include any other substance that does not interfere with the photopolymerization and further may include an amount of monomer participating in the photopolymerization that is neither a non-tertiary acrylic acid alkyl ester or a polar-group containing monomer, provided that such extraneous monomer(s) does not so effect the properties of the end product that such product is no longer a normally tacky pressure sensitive adhesive.

The inclusion of the suitable photoinitiator, such as 2,2-dimethoxy-2-phenylacetophenone, which is commercially available from Ciba-Geigy under the trade name of Irgacure 651, is a typical and convenient method of sensitizing the acrylic ester pressure sensitive adhesive formulation to the ultraviolet radiation. Nonetheless any other method of so sensitizing the formulation to photopolymerization upon exposure to ultraviolet radiation is believed suitable for the present process.

The advantages of the present process have been found particularly significant in a process in which a relatively thick, multi-layered pressure sensitive adhesive tape is prepared. This preferred embodiment conveniently employs an elongated chamber or tunnel having an upper wall of quartz glass, above which are disposed a plurality, or bank of, lamps providing the source of ultraviolet radiation required by the present process. If such lamps are the UV-B lamps described above, they may be conveniently placed from about ½ to about 12 inches above the surface of the formulation being polymerized, and preferably from about 1 to 8 inches above such surface, and more preferably from about 2 to 6 inches above such surface. To provide a uniform exposure to the radiation, such lamps are disposed in a plane parallel to the plane of the tape being made, and should be as long as such tape is wide. If the lamps are longer than the width of the tape, they may be skewed so that most of their effective length is disposed above the tape. Positioned within the chamber is a movable support surface, which conveniently is a continuous belt. Along the length of the chamber is at least one, and preferably more than one, station equipped for set down a layer of thickened monomer mixture or a layer of prepolymer on the support surface. Preferably such layer may be set down while the support surface or belt is moving along the chamber. Such stations may simply be provided with a vessel for holding a batch of the formulation, which vessel should have an outlet for the formulation, preferably permitting a controlled amount to continuously flow from the vessel onto the belt. If the belt is moving through the chamber, a doctor blade or similar means may be set adjacent the area at which the formulation is being fed to the belt to form a layer of the formulation of predetermined thickness. Beyond the station are a sufficient number of lamps to photopolymerize the layer, given the speed of the belt. If the station is the second or third or more in the line, the layer of formulation being so set down would not be applied directly to the belt but instead to the layer set down and photopolymerized before it.

For such an assembly, where the formulation(s) being polymerized move past the stationary lamps, the speed of movement must be adjusted to the effectiveness or rate at which the layer(s) are polymerized. For each layer, a conversion of about at least 95 percent of the monomer to the polymer is generally desired. For a given lamp, such conversion rate is significantly effected by its distance from the surface of the formulation being polymerized. Considering the entire assembly, the length of the chamber between stations (polymerization zone), and the density of lamps within such zone, are also factors which effect the conversion and hence the line speed required. For example, holding the other factors constant, one can increase conversion by moving the lamps closer to the formulation, or slowing the line speed, or lengthening the polymerization zone, or increasing the density of the lamps within the polymerization zone. In addition, the thickness of the formulation layer is generally a factor, a thicker layer requiring a greater degree of exposure. Where a thick layer is being polymerized in the same assembly as a thinner one, and hence the line speed for each is the same, it is convenient to increase the length of the polymerization zone for the thick layer.

The relatively thick, multi-layered pressure sensitive adhesive conveniently made using such type of assembly is comprised of a relatively thick layer, coated on at least one side with a thinner, and often more adhesive, layer. Particularly when the thick layer is sandwiched between two thinner layers, the thick layer is often referred to as a carrier or support layer, but it nonetheless has a degree of pressure sensitive adhesive properties although the surfaces thereof in the final product are not exposed. This does not exclude, however, the potential use of the present invention from polymerizing pressure sensitive adhesive layers onto both sides of a carrier or support material that is not a normally tacky pressure sensitive adhesive.

The relatively thick layer of this embodiment may be up to about 60 mils thick, and more preferably up to about 50 mils thick. A support or carrier layer having a thickness of from about 25 to 45 mils thickness is of the type that has been found very useful, particularly when faced on both sides with a thinner and more adhesive layer, because such types of adhesive systems have been found to possess high performance characteristics as to durability under stress conditions while conforming well to various substrates, particularly substrates that are themselves not flat. In such types of adhesive systems, the thick layer has been known to include a filler, such as the glass microbubbles disclosed in U.S. Pat. No. 4,223,067 (Levens) mentioned above. The thinner layers are conveniently from about 1 to about 5 mils thick.

The preparation of a thick, triple layered adhesive tape, having filler material in the center layer, is described in more detail in the following Example 1 and Comparative Example 2. Example 1 also includes a more detailed description of the use of the present invention for preparation of prepolymers that are subsequently used for this embodiment, which embodiment is not limited as to the prepolymer preparation method. In Comparative Example 2, the lamps used were of the type known as "UV-A" lamps, or "BLB" lamps, which have at least about 90 percent of their emissions in the 300 to 400 nm wavelength band and have a peak at about 351 nm. Their wattage, per linear length, is about the same as the UV-B lamps, and hence their intensity at a given distance is about the same.

EXAMPLE 1

An adhesive system of the present invention was prepared by photopolymerization using "UV-B" lamps as the source of ultraviolet radiation. Such lamps were 20 watt Westinghouse FS-20 lamps, which are two feet in length, and are described further as to spectral characteristics above. A mixture of 880 parts by weight 2-ethylhexyl acrylate, 120 parts by weight acrylic acid, and 1.0 part by weight Irgacure 651, was prepolymerized to a viscosity of from 1000 to 2000 cps (Brookfield viscometer) in a reaction vessel, by photopolymerization. The monomers and vessel were purged with nitrogen prior to the polymerization to remove oxygen, and the prepolymerization was accomplished by exposure to UV-B lamp radiation while the mixture was under constant agitation under a blanket of nitrogen atmosphere. Irgacure 651 is a photoinitiator (2,2-dimethoxy-2-phenylacetophenone) available under that tradename from Ciba-Geigy. This prepolymerized material was the adhesive layer prepolymer. In the same manner a carrier layer prepolymer was also prepared except that the prepolymerized mixture was comprised of 850 parts by weight of 2-ethylhexyl acrylate, 120 parts by weight of acrylic acid, 30 parts by weight of octyl/decyl acrylate, 20 parts by weight of Aerosil 200, and 1.0 part by weight of Irgacure 651, and this mixture was prepolymerized to a viscosity of 1500 to 3000 cps (Brookfield viscometer). The Aerosil 200 is an amorphous fumed silica, commerically available under that tradename from Degussa Corp. The subsequent complete polymerization of layers of such prepolymers was carried out on a movable line disposed within an elongated chamber, the upper wall of which was composed of quartz glass. Disposed above such chamber were a bank of the UV-B lamps. The chamber had a atmosphere of nitrogen provided by a source of nitrogen that had been first bubbled through a super-cooled isopropanol bath, so that the nitrogen not only excluded oxygen from the chamber, it also acted as a cooling means. The bank of lamps were divided into three polymerization zones, each of which zones were preceded by a station at which a layer of prepolymer was set down on the line. The first zone, an adhesive layer zone, was 12 feet long. The second zone, the carrier layer zone, was 21 feet long. The third zone, which was a second adhesive layer zone, was 17 feet long. The lamps were positioned at a density of about two lamps per foot of the line, and disposed centered and parallel to the line of the layers as they moved through the elongated chamber. The entire line, including both the polymerization zones and the stations at which the prepolymer layers were set down, was about 60 feet in length. At the stations the prepolymers were set down on the low-adhesion support belt within the chamber as the belt moved under the various prepolymer containers and the thickness of the prepolymer layers so formed was determined by doctor blades. The first prepolymer layer, an adhesive layer, was formed of the adhesive layer prepolymer to which was added 1.0 part by weight of Irgacure 651 and 0.6 parts by weight of 1,6 hexanediol diacrylate, and the layer set down was 3 mil thick. The carrier layer, which was set down over the polymerized first adhesive layer, was formed of the carrier layer prepolymer to which had been added 1.0 part by weight Irgacure 651, 0.3 parts by weight of 1,6 hexanediol diacrylate, and 100 parts by weight Vinac RP-251. Vinac RP-251 is a polyvinyl acetate used here as a filler and hence the carrier layer prepolymer was a "filled" layer, and was set down at a thickness of 34 mils. The third layer, the second adhesive layer, was set down on top of the polymerized carrier layer at a thickness of 2-3 mils. The second adhesive layer had the same composition as the first adhesive layer, having been made from the same batch of adhesive prepolymer. The compositions of both the adhesive and carrier layer prepolymers given above, including the materials added after the prepolymerizations, are "batches" of prepolymers prepared for complete polymerization, and the relative amounts prepared in each batch is not indicative of the relative amounts used for a given length of adhesive system prepared. The lamps were disposed 6 inches above the adhesive system being polymerized, and the line speed was maintained continuously at 5 ft/min. A sample of the adhesive system so prepared was dried for a one hour period at a temperature of 350° F., and then cooled to room temperature and weighed; the loss of weight in such drying was 2.3 weight percent. Hence the adhesive system was determined to have been converted 97.7 weight percent from monomer to polymer.

COMPARATIVE EXAMPLE 2

The procedure set forth in Example 1 above was repeated except that instead of the UV-B lamps, "UV-A" lamps were used. Such UV-A lamps were 15 watt Sylvania F15T8-BLB lamps, which are 18 inches long. Such lamps were disposed 3 inches above the adhesive system being prepolymerized and the line speed was reduced to 4 ft./min. Other than these exceptions, all other process conditions, including formulations, lamp density, and the like, were the same as in Example 1 above. Using the same drying method, it was determined that the adhesive system had been converted 98.1 percent from monomer to polymer.

The octyl/decyl acrylate used in the above examples was a mixture of linear acrylates of $C_8$ and $C_{10}$ alkyl alcohols commercially available from Interez Co. The amorphous fumed silica is also a type of filler, which here helps to provide an even distribution of the polyvinyl acetate added later. Both of these fillers are substantially inert to ultraviolet radiation and do not participate in the photopolymerization.

In the above examples, cooling is provided by the use of cooled nitrogen gas. Such cooling was determined to hold the temperature in the polymerization zone of the bottom adhesive layer to about 50° F., and the temperature in the polymerization zone of the filled carrier layer to about 80–100° F. The desired maximum temperature will depend upon a number of factors, such as the volatility of the monomers being used, and the means for cooling the reacting formulation may be any of a variety of well known cooling means.

Peel Test: A strip of the adhesive tape (about 150 mm in length) is applied to a primed polyvinyl chloride bar (test bars using XP11-289-A1, Lynn Plastic, The Standard Products Company, Dearborn, Mich., shaped so that it can be gripped by a Tester for pulling away from a painted panel), followed by one pass of a 6.8 kg weighted roller on the tape side. The tape liner is then removed from the tape and the tape, with the polyvinyl chloride bar, is applied to a steel panel coated with an exterior finish automotive paint, followed by two passes (in the same direction) on top of the polyvinyl chloride bar with a 6.8 kg weighted roller. The Tester is designed for a 90° pull angle upon displacement of a moving platform to which the steel panel is attached. The grip moves at a speed of about 12 inches per minute. The Tester includes a recorder which records force versus the distance travelled. In this test two parameters are determined. First is the force required to start the breaking of the bonding of the polyvinyl chloride bar to the steel plate, which is called the Peel "breakaway" force or "Initial Breakaway Peel". The The second parameter determined is the force needed to continue the breaking of the bond along the length of the bond after initial breakaway, which is called the Peel "continuous" force or "Initial Continuing Peel".

Pluck Test: The pluck test differs from the peel test generally in that only about one inch length of the adhesive tape is used and hence only a one inch segment of the polyvinyl chloride bar is bonded to the steel panel. Only one parameter is determined, which is the force required to pluck the bar away from the steel panel. The pull of the Tester is again at about a 90° angle and the grip is displaced at a speed of about 2.5 cm per minute.

Creep Test: The creep test differs from the peel test in that the polyvinyl bar is attached to the steel panel so as to leave about a 12.7 mm overhang, and then a 72 hour dwell period is allowed, after which a 1000 gram weight is attached to the overhanging section of the bar. The panel is then supported in a vertical position in an oven at 70° C. for 96 hours, after which the weight is removed, and the panel and bar are permitted a further 72 hour dwell time at room temperature. The creep displacement is then measured.

The adhesive systems prepared as described in Examples 1 and 2 above were subjected to the various performance tests described above, the results of which are set forth in Table I below.

TABLE I

| Test | Test Result | |
|---|---|---|
| | Adhesive System of Example 1 | Adhesive System of Comparative Example 2 |
| Pluck Test | 61.7 lbs | 48.5 lbs |
| Initial Breakaway Peel Test | 37.6 lbs | 34.7 lbs |
| Inital Continuing Peel Test | 19.1 lbs | 16.4 lbs |
| Creep Test (1000 gms) | No Slip | No Slip |

The apparatus and process described in Example 1 above provides a photopolymerization such that each layer of acrylic ester pressure sensitive adhesive formulation is substantially fully polymerized before the subsequent layer is set down, and the complete adhesive tape so produced is substantially fully polymerized. By substantially polymerized, or substantially fully polymerized, is meant herein a conversion of monomer to polymer of at least about 95 percent, and preferably at least about 97 percent. Similar to the use of the process of the present invention for the preparation of a prepolymer, the present invention does not exclude the use of the process for partial photopolymerization for other purposes. For purposes of setting down a viscous layer of photopolymerizable formulation, a prepolymer conveniently is polymerized to a viscosity of from about 500 cps to about 10,000 cps, although a desired viscosity is dependent upon many factors, such as the means by which it will be applied and the thickness of the layer that will be formed with it. Generally, the thicker the desired layer, the higher is the appropriate viscosity.

Except for percentages of energy or power, the terms "percent" and "percentage" as used herein refer to percent by weight unless expressly indicated otherwise.

Industrial Applicability of the Invention

The present invention is applicable to the pressure sensitive adhesive industry and any other industry that employs or may employ pressure sensitive adhesives for sealing, attachment, or other purposes, for instance the automotive industry where pressure sensitive adhesives are used for attachment of body moldings and various trim items to the body of the vehicle, thereby avoiding perforating the vehicle body pursuant to such attachments.

We claim:

1. A method for the preparation of a normally tacky pressure sensitive adhesive by polymerizing an acrylic ester pressure sensitive adhesive formulation substantially free of non-polymerizable solvent, said acrylic ester pressure sensitive adhesive formulation comprising non-tertiary acrylic acid alkyl ester formed from an alcohol having from about 4 to about 10 carbon atoms and an ethylenically unsaturated monomer having a polar group, or a prepolymer prepared by the partial polymerization of said monomers, characterized by:

at least partially photopolymerizing said acrylic ester pressure sensitive adhesive formulation by exposure to a source of ultraviolet radiation that provides at least about 80 percent of its radiation in the wavelength band of from about 280 to about 350 nm and provides from about 20 to about 25 percent of its radiation of the 200 to 400 nm wavelength band within the wavelength range of below about 300 nm and from about 75 to about 80 percent of its radiation of the 200 to 400 nm wavelength band within the wavelength range of from about 300 to about 400 nm, and has a light intensity in the wavelength band of from 200 to 400 nm of no more than about 4.0 milliwatts/cm$^2$ at the surface of said formulation being polymerized, said photopolymerization being continued until at least 95% of the monomer has been converted to polymer.

2. The method of claim 1 wherein said light intensity in the wavelength band of from 200 to 400 nm at the surface of said formulation being polymerized is from about 0.1 to about 4.0 milliwatts/cm$^2$.

3. The method of claim 1 wherein said source of ultraviolet radiation provides at least about 90 percent of its ultraviolet radiation in the wavelength band of from about 280 to about 350 nm.

4. The method of claim 3 wherein said source of ultraviolet radiation provides at least about 90 percent of its ultraviolet radiation in the wavelength band of from about 280 to about 350 nm.

5. The method of claim 1 wherein said source of ultraviolet radiation provides at least about 70 percent of its energy from the 280 to about 350 nm wavelength band in the wavelength band of from about 290 to about 335 nm.

6. The method of claim 5 wherein said source of ultraviolet radiation provides about 80 to 90 percent of its energy from the 280 to 350 nm wavelength band in the wavelength band of from about 290 to about 335 nm.

7. The method of claim 1 wherein said formulation being at least partially photopolymerized includes a cross-linking agent.

8. The method of claim 1 wherein said formulation being at least partially photopolymerized includes at least one substance that is substantially inert to said photopolymerization.

9. The method of claim 1 wherein said formulation being at least partially photopolymerized is in the form of a layer of from about 25 to about 45 mil in thickness.

10. The method of claim 1 wherein said source of ultraviolet radiation is at least one UV-B lamp.

11. A method for the preparation of a normally tacky pressure sensitive adhesive by polymerizing an acrylic ester pressure sensitive adhesive substantially free of non-polymerizable solvent formulation, said acrylic ester pressure sensitive adhesive formulation comprising non-tertiary acrylic acid alkyl ester formed from an alcohol having from about 4 to about 10 carbon atoms and an ethylenically unsaturated monomer having a polar group, or a prepolymer prepared by the partial polymerization of said monomers, characterized by:
   at least partially photopolymerizing said acrylic ester pressure sensitive adhesive formulation by exposure to a source of ultraviolet radiation that provides at least about 80 percent of its radiation in the wavelength band of from about 280 to about 350 nm and has a spectral peak at about 310 nm;
   and has a light intensity in the wavelength band of from 200 to 400 nm of no more than about 4.0 milliwatts/cm² at the surface of said formulation being polymerized said photopolymerization being continued until at least 95% of the monomer has been converted to polymer.

12. The method of claim 11 wherein said source of ultraviolet radiation is at least one UV-B lamp.

13. The method of claim 11 wherein said formulation being at least partially photopolymerized is in the form of a layer of from about 25 to about 45 mil in thickness.

14. A method for the preparation of a normally tacky pressure sensitive adhesive by polymerizing an acrylic ester pressure sensitive adhesive formulation substantially free of non-polymerizable solvent formulation, said acrylic ester pressure sensitive adhesive formulation comprising non-tertiary acrylic acid alkyl ester formed from an alcohol having from about 4 to about 10 carbon atoms and an ethylenically unsaturated monomer having a polar group, or a prepolymer prepared by the partial polymerization of said monomers, characterized by:
   at least partially photopolymerizing said acrylic ester pressure sensitive adhesive formulation by exposure to a source of ultraviolet radiation that provides at least about 80 percent of its radiation in the wavelength band of from about 280 to about 350 nm,
   provides from about 20 to about 25 percent of its radiation of the 200 to 400 nm wavelength band within the wavelength range of below about 300 nm and from about 75 to about 80 percent of its radiation of the 200 to 400 nm wavelength band within the wavelength range of from about 300 to about 400 nm,
   has a spectral peak at about 310 nm,
   and has a light intensity in the wavelength band of from 200 to 400 nm of no more than about 4.0 milliwatts/cm² at the surface of said formulation being polymerized; and
   wherein said formulation being at least partially photopolymerized is in the form of a layer of from about 25 to about 45 mil in thickness said photopolymerization being continued until at least 95% of the monomer has been converted to polymer.

15. The method of claim 14 wherein said source of ultraviolet radiation is at least one UV-B lamp.

* * * * *

UNITED STATES PATENT AND TRADEMARK OFFICE
CERTIFICATE OF CORRECTION

PATENT NO. : 5,183,833
DATED : February 2, 1993
INVENTOR(S) : D. K. Fisher and B. J. Briddell It is certified that error appears in the above-identified patent and that said Letters Patent is hereby corrected as shown below:

In column 12, line 55, which is line 1 of Claim 4 delete "claim 3" and substitute therefore --claim 2-- .

In column 13, lines 16 to 17, which are lines 3 to 4 of Claim 11, delete "substantially free of non-polymerizable solvent formulation" and substitute therefor -- formulation substantially free of non-polymerizable solvent -- .

In column 14, line 7, which is line 4 of Claim 14, after "solvent" delete "formulation".

Signed and Sealed this

Ninth Day of November, 1993

*Attest:*

BRUCE LEHMAN

*Attesting Officer*     *Commissioner of Patents and Trademarks*